(12) United States Patent
Furuyama

(10) Patent No.: US 11,521,615 B2
(45) Date of Patent: Dec. 6, 2022

(54) VEHICULAR APPARATUS, VEHICLE, OPERATION METHOD OF VEHICULAR APPARATUS, AND STORAGE MEDIUM

(71) Applicant: HONDA MOTOR CO., LTD., Tokyo (JP)

(72) Inventor: Naoto Furuyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 113 days.

(21) Appl. No.: 17/090,099

(22) Filed: Nov. 5, 2020

(65) Prior Publication Data
US 2021/0142802 A1 May 13, 2021

(30) Foreign Application Priority Data
Nov. 12, 2019 (JP) ................ JP2019-204823

(51) Int. Cl.
G10L 15/20 (2006.01)
G10L 15/22 (2006.01)
H04R 1/32 (2006.01)
H04R 1/02 (2006.01)

(52) U.S. Cl.
CPC ............ *G10L 15/22* (2013.01); *G10L 15/20* (2013.01); *H04R 1/025* (2013.01); *H04R 1/326* (2013.01)

(58) Field of Classification Search
CPC ..... G10L 15/20; G10L 15/22; G10L 21/0208; G10L 2021/02166; H04R 1/025; H04R 1/326; H04R 3/005; H04R 2410/01; H04R 2430/01; H04R 2420/01; H04R 2499/13; H04R 3/02; B62K 21/00
USPC ........................................................ 704/233
See application file for complete search history.

(56) References Cited

U.S. PATENT DOCUMENTS

| 8,885,847 B2 | 11/2014 | Miyazaki | |
|---|---|---|---|
| 2012/0083973 A1* | 4/2012 | Araki | B62K 21/00 701/43 |
| 2013/0090932 A1 | 4/2013 | Miyazaki | |

FOREIGN PATENT DOCUMENTS

| JP | 2010283506 A | 12/2010 | |
|---|---|---|---|
| JP | 2013083751 A | 5/2013 | |
| JP | 2019-001313 A | 1/2019 | |
| WO | 2013/153583 A1 | 10/2013 | |
| WO | WO-2013153583 A1 * | 10/2013 | ............. H04R 1/406 |

OTHER PUBLICATIONS

Japanese Office Action issued for Japanese Patent Application No. 2019-204823 dated Mar. 7, 2022 (with Partial Translation).

* cited by examiner

*Primary Examiner* — Md S Elahee
(74) *Attorney, Agent, or Firm* — Thomas | Horstemeyer, LLP

(57) ABSTRACT

A vehicular apparatus having at least one of a voice calling function and a voice recognition function, the apparatus comprising a voice input unit including a plurality of microphones, the voice input unit being disposed between a driver's seat and a passenger seat with respect to a vehicle width direction; and a control unit configured to control a directionality direction and a gain level of each of the plurality of microphones, wherein the control unit controls the directionality directions of the plurality of microphones in two directions, the two directions being a driver's seat side and a passenger seat side, and controls a gain level on the passenger seat side to be lower than a gain level on the driver's seat side.

18 Claims, 10 Drawing Sheets

VEHICULAR APPARATUS, VEHICLE, OPERATION METHOD OF VEHICULAR APPARATUS, AND STORAGE MEDIUM

CROSS-REFERENCE TO RELATED APPLICATION(S)

This application claims priority to and the benefit of Japanese Patent Application No. 2019-204823 filed on Nov. 12, 2019, the entire disclosure of which is incorporated herein by reference.

BACKGROUND OF THE INVENTION

Field of the Invention

The present invention relates to a vehicular apparatus, a vehicle, an operation method of a vehicular apparatus, and a storage medium.

Description of the Related Art

Japanese Patent Laid-Open No. 2013-83751 discloses switching the directionality of a microphone to the direction of a selected seat. Japanese Patent Laid-Open No. 2010-283506 discloses detecting a talker's seat position and a state of a vehicle cabin acoustic space at the time of speech, selecting a microphone from among a plurality of microphones, and variably controlling the directionality of the microphone on the basis of a correction parameter corresponding to the selected microphone. This makes it possible to provide a hands-free calling and voice recognition environment adapted to usage conditions.

However, with the technique disclosed in Japanese Patent Laid-Open No. 2013-83751, the directionality is switched to the direction of a specific seat, which causes a drop in the call quality in the directions of other seats. Additionally, with the technique disclosed in Japanese Patent Laid-Open No. 2010-283506, microphones are provided both on the driver's seat side and the passenger seat side, which increases the manufacturing cost.

The present invention provides a favorable acoustic environment on both a driver's seat side and a passenger seat side at low cost.

SUMMARY OF THE INVENTION

According to one aspect of the present invention, there is provided a vehicular apparatus having at least one of a voice calling function and a voice recognition function, the apparatus comprising a voice input unit including a plurality of microphones, the voice input unit being disposed between a driver's seat and a passenger seat with respect to a vehicle width direction, the apparatus further comprising:
 a memory storing a program; and
 one or more processors which, by executing the program, function as:
 a control unit configured to control a directionality direction and a gain level of each of the plurality of microphones;
 a noise cancelling unit configured to calculate a noise component of voice input by the voice input unit and reduce the noise component; and
 an execution unit configured to execute the voice calling function or the voice recognition function on the basis of voice in which the noise component has been reduced by the noise cancelling unit,
 wherein the control unit controls the directionality directions of the plurality of microphones in two directions, the two directions being a driver's seat side and a passenger seat side, and controls a gain level on the passenger seat side to be lower than a gain level on the driver's seat side.

DESCRIPTION OF THE EMBODIMENTS

Figure 1:
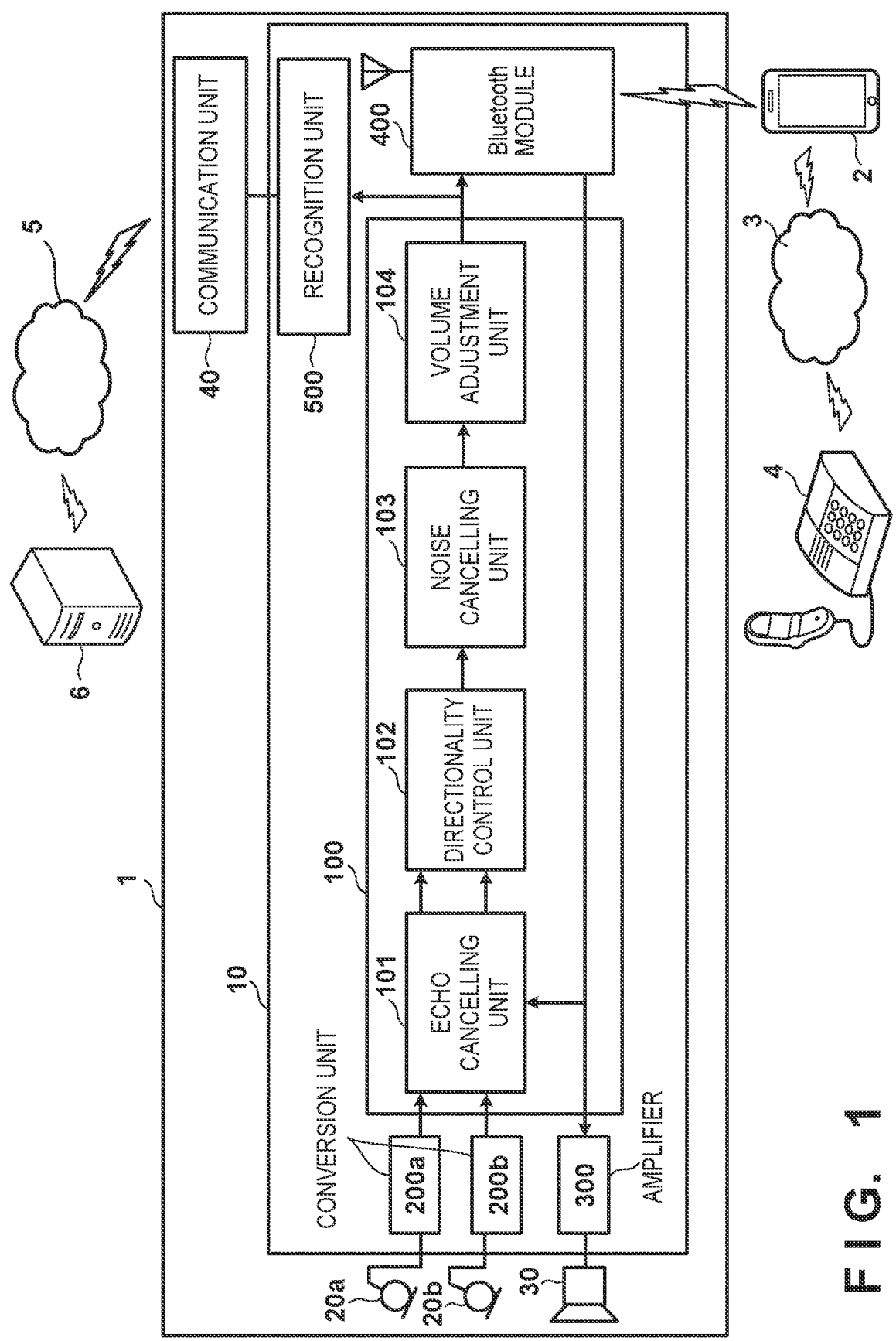
FIG. 1 is a diagram illustrating an example of the overall configuration of a communication system and the configuration of a vehicular apparatus according to an embodiment.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

Configurations of Communication System and Vehicular Apparatus

FIG. 1 is a diagram illustrating an example of the overall configuration of a communication system and the configuration of a vehicular apparatus according to an embodiment. In FIG. 1, a vehicular apparatus 1 can communicate with a voice recognition server 6 over a network 5. The network 5 is the Internet, for example. The voice recognition server 6 transmits a search result based on voice detected within a vehicle to the vehicular apparatus 1. The vehicular apparatus 1 outputs the received search result to a user as audio, text, an image, video, or the like. This makes it possible to execute a voice recognition function.

The vehicular apparatus 1 also communicates with a communication terminal 2 in the possession of a user in the vehicle. The communication terminal 2 communicates with a communication terminal 4 of a third party over a network 3. The network 3 is the Internet or a telephone line, for example. This makes it possible to execute a voice calling function, e.g., a hands-free calling function.

Although the present embodiment describes an example in which both a voice recognition function and a voice calling function are provided, the configuration may be such that at least one of these functions is provided.

The vehicular apparatus 1 includes ahead unit 10, a plurality of microphones 20a and 20b, a speaker 30, and a communication unit 40. Any number of microphones may be provided as long as it is a plurality, and the number thereof is not limited. The plurality of microphones 20a and 20b, the speaker 30, and the communication unit 40 may be configured as entities separate from the vehicular apparatus 1. The plurality of microphones 20a and 20b are disposed between a driver's seat and a passenger seat with respect to a vehicle width direction.

Figure 2:
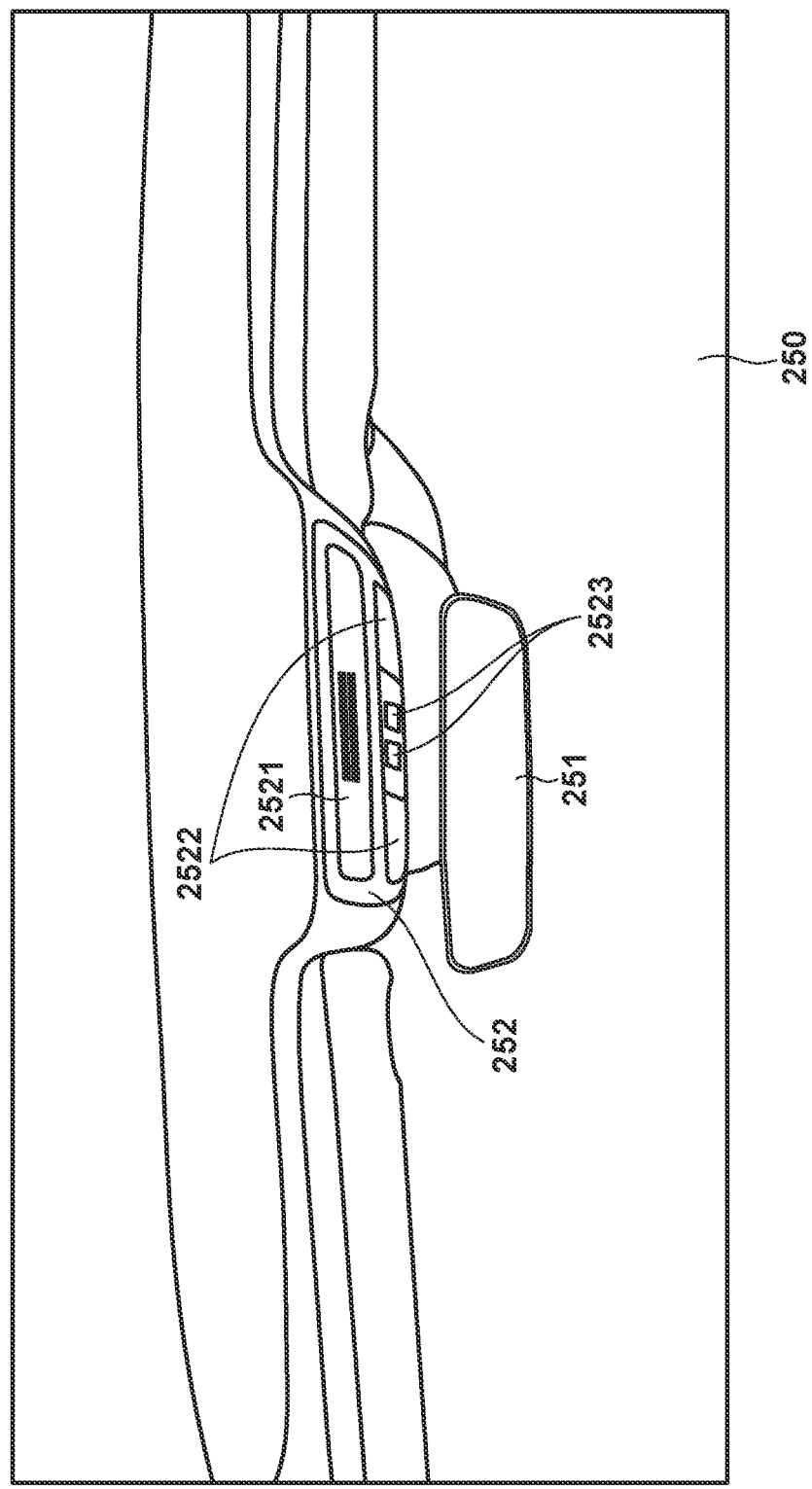
FIG. 2 is a diagram illustrating installation positions of a plurality of microphones according to an embodiment.

An example of the arrangement of the plurality of microphones 20a and 20b according to the embodiment will be described here with reference to FIG. 2. FIG. 2 is a diagram illustrating a view of the direction of a windshield as seen from inside the vehicle. 250 indicates a part of the windshield. 251 indicates a rearview mirror, and 252 indicates a roof console. The roof console 252 includes a garnish 2521 having the plurality of microphones 20a and 20b disposed inside, a lighting unit 2522, and an operating switch 2523. In this manner, the plurality of microphones 20a and 20b are, for example, disposed in the roof console 252 between the driver's seat and the passenger seat with respect to the vehicle width direction.

The head unit 10 includes a digital signal processing unit 100, conversion units 200a and 200b, an amplifier 300, a Bluetooth module 400, and a voice recognition unit 500.

Voice input from the plurality of microphones is converted from analog to digital by the conversion units 200a and 200b, and is then output to the digital signal processing unit 100. The digital signal processing unit 100 executes various types of processing on the basis of the voice signals obtained from the conversion units 200a and 200b, and outputs results of the processing to the voice recognition unit 500 or the Bluetooth module 400 on the basis of the type of function to be used (the voice recognition function or the voice calling function).

The functions of the digital signal processing unit 100, the voice recognition unit 500, and the like are implemented by one or more CPUs, for example. The CPU implements the functions of the vehicular apparatus 1 by controlling the vehicular apparatus 1 as a whole using computer programs and data stored in a storage unit (not shown). Note that the vehicular apparatus 1 may have one or more dedicated pieces of hardware different from the CPU, and at least some of the processing performed by the CPU may be performed by the dedicated hardware. An application-specific integrated circuit (ASIC), a field programmable gate array (FPGA), and so on can be given as examples of such dedicated hardware.

The storage unit (not shown) is ROM, RAM, and/or a hard disk drive. Programs and the like which need not be changed are stored in the ROM. The RAM temporarily stores programs and data supplied from the hard disk drive, data supplied from the exterior via the communication unit 40 and/or the Bluetooth module 400, and the like. The hard disk drive stores various types of data, such as voice data, data pertaining to the directionality of microphones, and so on.

The communication unit 40 includes an antenna, and is used when the vehicular apparatus 1 communicates with an external apparatus. The communication unit 40 obtains a recognition result from the recognition unit 500 and transmits that recognition result to the voice recognition server 6 over the network 5. The voice recognition server 6 performs a search on the basis of the obtained recognition result, and transmits a search result to the vehicular apparatus 1 over the network 5. The vehicular apparatus 1 outputs the search result to the user using a variety of methods.

The Bluetooth module 400 communicates with the communication terminal 2 in the possession of a user in the vehicle, and executes a voice calling function, and a hands-free calling function in particular, as described earlier.

The digital signal processing unit 100 includes an echo cancelling unit 101, a directionality control unit 102, a noise cancelling unit 103, and a volume adjustment unit 104. The functions of the digital signal processing unit 100 are implemented, for example, by a CPU provided in the head unit 10 of the vehicle. A voice input module configured including the plurality of microphones 20a and 20b disposed in the roof console 252 does not include a CPU, and voice processing is instead executed by the CPU provided in the head unit 10 of the vehicle. This makes it possible to reduce the space taken up by the voice input module and reduce costs.

The echo cancelling unit 101 performs processing for reducing an echo component contained in voice signals obtained from the conversion units 200a and 200b by using an incoming call signal received by the communication terminal 2 via the Bluetooth module 400. Through this, when executing the voice calling function, and particularly when executing the hands-free calling function, the call quality can be improved.

The directionality control unit 102 controls a directionality direction and a gain level of each of the plurality of microphones 20a and 20b. The control of the directionality direction and the gain level with respect to the driver's seat and the passenger seat will be described here with reference to FIG. 3. In the present embodiment, the directionality control unit 102 controls the directionality directions of the plurality of microphones 20a and 20b in two directions, to the driver's seat side and the passenger seat side, and furthermore controls the gain level on the passenger seat side to be lower than the gain level on the driver's seat side. The directionality control unit 102 may control the directionality on the basis of a predetermined direction (a direction facing a predetermined position of the driver's seat; a direction facing a predetermined position of the passenger seat), or may control the directionality on the basis of voice signals input from the plurality of microphones 20a and 20b.

Figure 3:
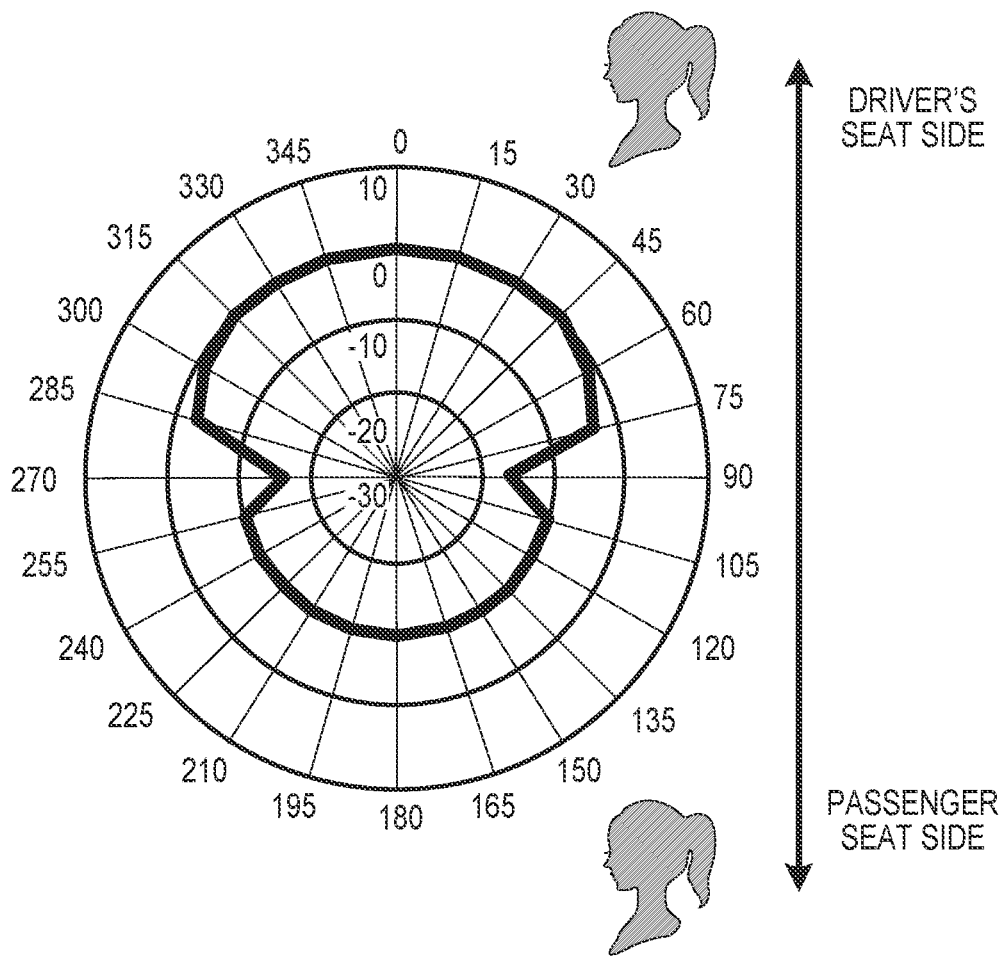
FIG. 3 is a diagram illustrating directionality control according to an embodiment.

In FIG. 3, the bold line indicates the directionality directions and the gain levels. The gain level is set for each direction in 360 degrees from the center of the circle. In the example illustrated in FIG. 3, the driver's seat side (e.g., 0 to 75 degrees and 285 to 360 degrees) is taken as a directionality direction, and the gain level thereof is set to near zero. Meanwhile, while the passenger seat side (e.g., 105 to 255 degrees) is also taken as a directionality direction, the gain level thereof is set to be less than the gain level on the driver's seat side (−10, in the example illustrated in FIG. 3).

Thus by disposing the plurality of microphones 20a and 20b in a single location between the driver's seat and the passenger seat and using two directions, i.e., the driver's seat side and the passenger seat side, for the directionality directions, the manufacturing cost can be kept lower than when disposing microphones in a plurality of locations. When detecting talking states in both the driver's seat and the passenger seat and switching directionality characteristics, there are situations where the sound drops out when switching the directionality characteristics. However, according to the configuration of the present embodiment, voice from both the driver's seat side and the passenger seat side can be collected without any such dropouts.

However, when both the directions of the driver's seat side and the passenger seat side are used as directionality directions, voice containing a large amount of noise may be collected. Accordingly, the gain levels are adjusted individually for the driver's seat side and the passenger seat side, and the gain level on the passenger seat side is controlled to be lower than the gain level on the driver's seat side. A certain S/N ratio can therefore be ensured on the driver's seat side, where the calling frequency is relatively high; this makes it possible to provide an environment in which calls can also be made on the passenger seat side, where the calling frequency is relatively low, while at the same time improving the call quality on the driver's seat side.

Note that because both the driver's seat side and the passenger seat side are taken as directionality directions, the performance of estimating echo is higher than when only a single specific directionality direction is used. This also improves the performance of the echo cancelling processing performed by the echo cancelling unit 101 when executing the voice calling function, and particularly when executing the hands-free calling function.

Furthermore, in the present embodiment, the directionality control is performed after reducing echo. Doing so makes it possible to further improve the performance of estimating echo, which in turn makes it possible to improve the performance of the processing performed by the echo cancelling unit 101.

The noise cancelling unit 103 calculates a noise component contained in the voice signal, and performs processing for reducing that noise component. The volume adjustment unit 104 adjusts the gain so that the voice signal, which has changed over the course of the various types of processing, is output at an appropriate level.

Processing by Vehicular Apparatus

Figure 4:
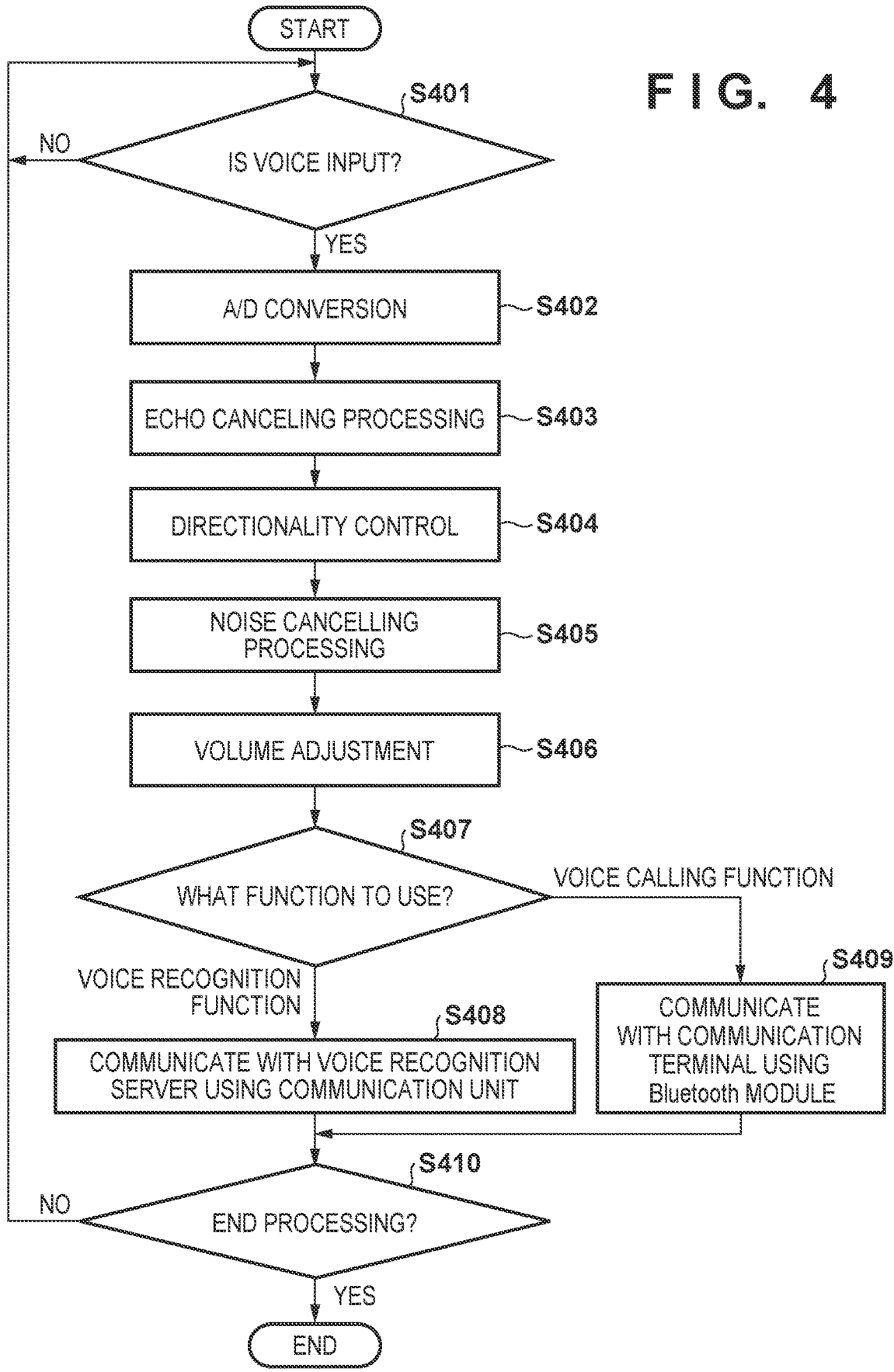
FIG. 4 is a flowchart illustrating a processing sequence performed by the vehicular apparatus according to an embodiment.

A processing sequence performed by the vehicular apparatus 1 according to the embodiment will be described next with reference to the flowchart in FIG. 4.

In step S401, the conversion units 200*a* and 200*b* determine whether or not voice has been input from the plurality of microphones 20*a* and 20*b*. The sequence moves to step S402 if voice has been input. If voice has not been input, however, the units stand by until voice is input.

In step S402, the conversion units 200*a* and 200*b* convert the voice signals input from the plurality of microphones 20*a* and 20*b* into digital signals through analog-to-digital conversion.

In step S403, the echo cancelling unit 101 performs processing for reducing an echo component contained in the digital signals obtained from the conversion by the conversion units 200*a* and 200*b*, by using an incoming call signal received by the communication terminal 2 via the Bluetooth module 400.

In step S404, the directionality control unit 102 controls the directionality directions of the plurality of microphones 20*a* and 20*b* in two directions, to the driver's seat side and the passenger seat side, and furthermore controls the gain level on the passenger seat side to be lower than the gain level on the driver's seat side.

In step S405, the noise cancelling unit 103 calculates a noise component contained in the voice signal, and performs processing for reducing that noise component. In step S406, the volume adjustment unit 104 adjusts the gain so that the voice signal, which has changed over the course of the various types of processing, is output at an appropriate level.

In step S407, the vehicular apparatus 1 determines which function is in use. The sequence moves to step S408 if the function in use is the voice recognition function. On the other hand, the sequence moves to step S409 if the function in use is the voice calling function (e.g., the hands-free calling function).

In step S408, the vehicular apparatus 1 recognizes voice using the recognition unit 500, and transmits the recognition result to the voice recognition server 6 over the network 5 using the communication unit 40. The voice recognition server 6 performs a search on the basis of the obtained recognition result, and transmits a search result to the vehicular apparatus 1 over the network 5. The vehicular apparatus 1 outputs the search result to the user using a variety of methods.

For example, when a destination for a route set in a navigation apparatus has been spoken, that destination is recognized, the navigation route is searched for in the voice recognition server 6, and the search result is presented. Alternatively, if the address of a destination has been spoken, that address is recognized, a navigation route leading to the address is searched for in the voice recognition server 6, and the search result is presented. The configuration may be such that various other types of processing based on speech uttered by the user are performed, and processing results are then presented.

In step S409, the vehicular apparatus 1 communicates with the communication terminal 2, which is in the possession of a user in the vehicle, using the Bluetooth module 400. The communication terminal 2 communicates with the communication terminal 4 of a third party over the network 3, and thus the voice calling function, e.g., the hands-free calling function, can be executed.

In step S410, the vehicular apparatus 1 determines whether or not to end the processing. The processing is ended when, for example, no voice is input for a predetermined length of time after using the voice recognition function, or when the voice calling function is ended, e.g., when a call between the communication terminal 2 and the communication terminal 4 has been terminated. On the other hand, if the processing is not to be ended, the sequence returns to step S401 and the processing sequence is repeated. This ends the processing illustrated in FIG. 4.

As described above, in the present embodiment, the directionality directions of the plurality of microphones is controlled in two directions, to the driver's seat side and the passenger seat side, and the gain level on the passenger seat side is furthermore controlled to be lower than the gain level on the driver's seat side. A certain S/N ratio can therefore be ensured on the driver's seat side, where the calling frequency is relatively high; this makes it possible to provide an acoustic environment in which calls can also be made on the passenger seat side, where the calling frequency is relatively low, while at the same time improving the call quality on the driver's seat side.

Additionally, in the present embodiment, the voice input module including the plurality of microphones is disposed between the driver's seat and the passenger seat with respect to the vehicle width direction. Manufacturing costs can therefore be kept lower than when voice input modules are disposed in a plurality of locations.

First Variation

The foregoing embodiment described an example in which the directionality control unit 102 controls the directionality directions of the plurality of microphones 20*a* and 20*b* in two directions, to the driver's seat side and the passenger seat side, and furthermore controls the gain level on the passenger seat side to be lower than the gain level on the driver's seat side.

The directionality control unit 102 may be configured to change the gain level on the passenger seat side on the basis of the speed of the vehicle in which the vehicular apparatus 1 is disposed or a level of the noise component calculated by the noise cancelling unit 103.

For example, the gain level on the passenger seat side may be made equal or brought closer to the gain level on the driver's seat side as the vehicle speed decreases or the level of the noise component decreases. Conversely, the gain level on the passenger seat side may be made equal or moved away from the gain level on the driver's seat as the vehicle speed increases or the level of the noise component increases.

The level of noise decreases as the vehicle speed decreases. Thus when the vehicle is stopped or traveling at a low speed, or in other situations where the level of the noise component is low, setting the gain level on the passenger seat side to be substantially equal to the gain level on the driver's seat side makes it possible to improve the call quality on the passenger seat side.

Conversely, the level of noise increases as the vehicle speed increases. Thus when the vehicle is traveling at a high speed, or in other situations where the level of the noise component is high, setting the gain level on the passenger seat to be lower than the gain level on the driver's seat side reduces the influence of noise input from the passenger seat side.

Figure 5:
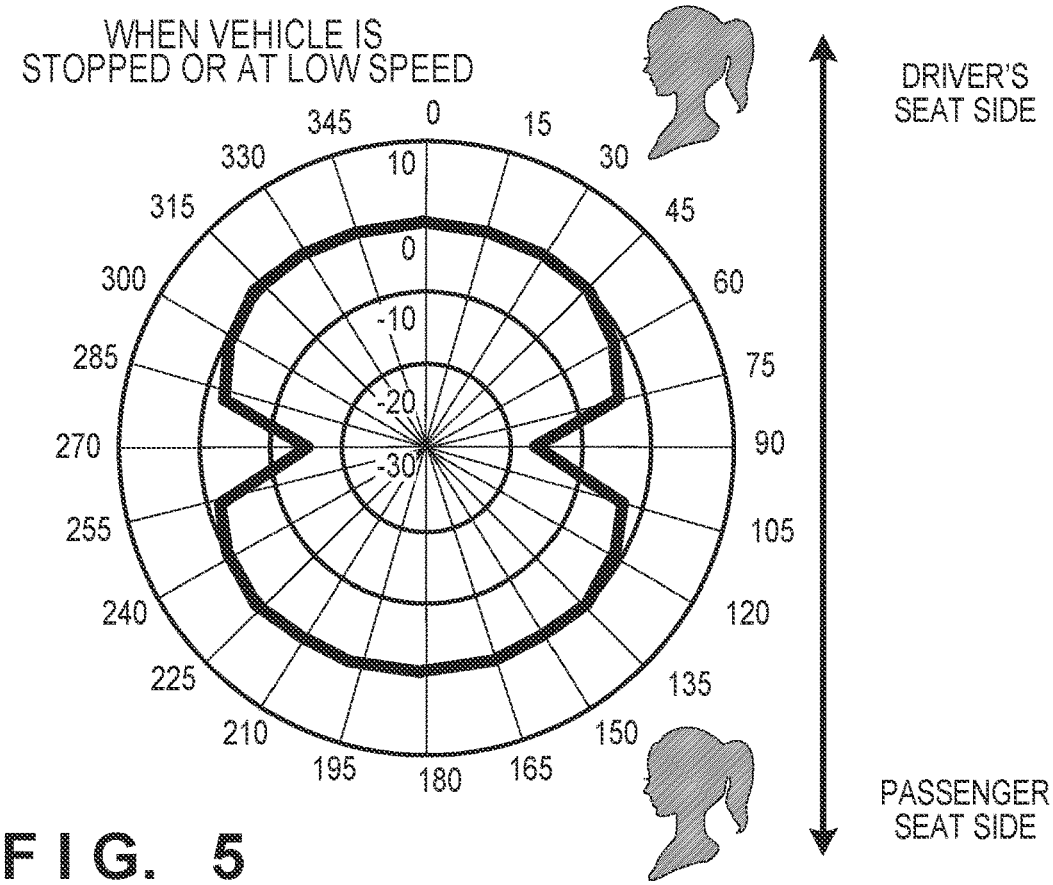
FIG. 5 is a diagram illustrating directionality control according to a first variation.
Figure 6:
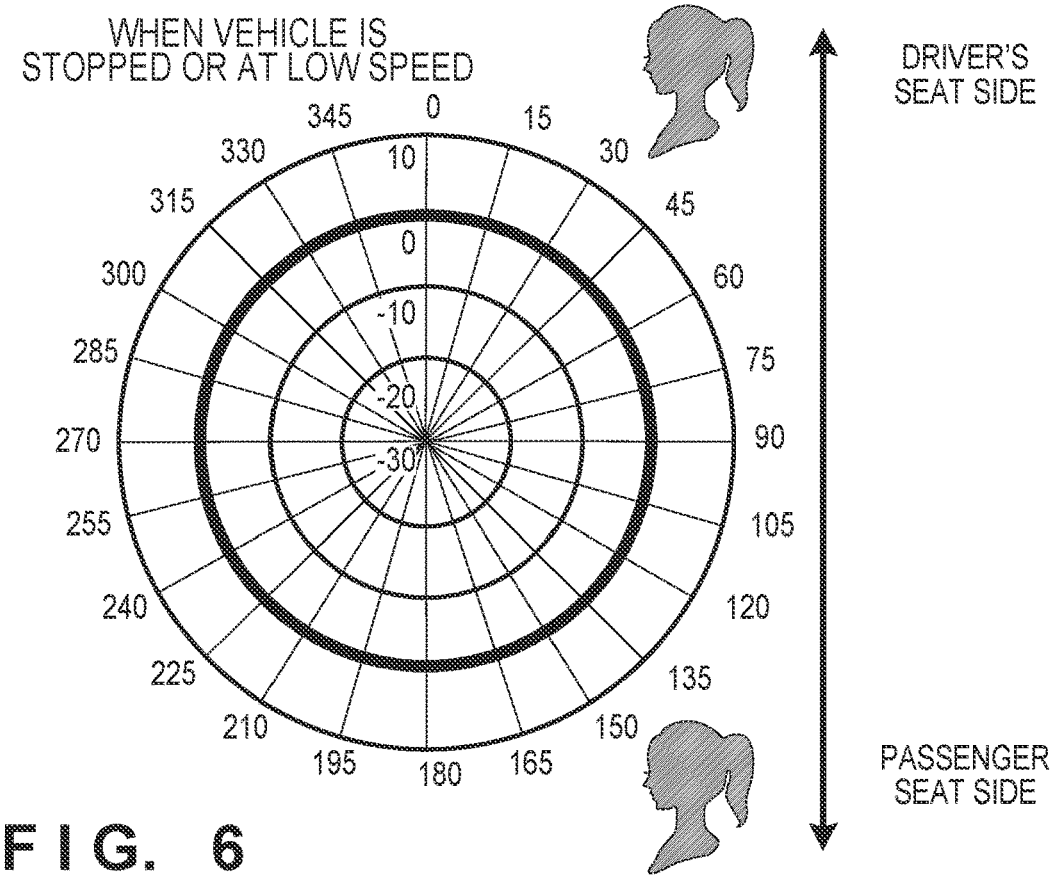
FIG. 6 is a diagram illustrating directionality control according to the first variation.

For example, FIGS. 5 and 6 illustrate examples of directionality control when the vehicle is stopped or traveling at a low speed (or when the level of the noise component is low). As illustrated in FIG. 5, the directionality for the driver's seat (the directionality direction and the gain level) is controlled to be the same as the directionality for the passenger seat (the directionality direction and the gain level). Alternatively, the microphones may be controlled to be nondirectional (omnidirectional), with the same gain level, as illustrated in FIG. 6. Setting the gain level on the passenger seat side to be substantially equal to the gain level on the driver's seat side makes it possible to improve the call quality on the passenger seat side.

Processing by Vehicular Apparatus

A processing sequence performed by the vehicular apparatus 1 according to the first variation will be described next with reference to the flowchart in FIGS. 7A and 7B.

Figure 7A:
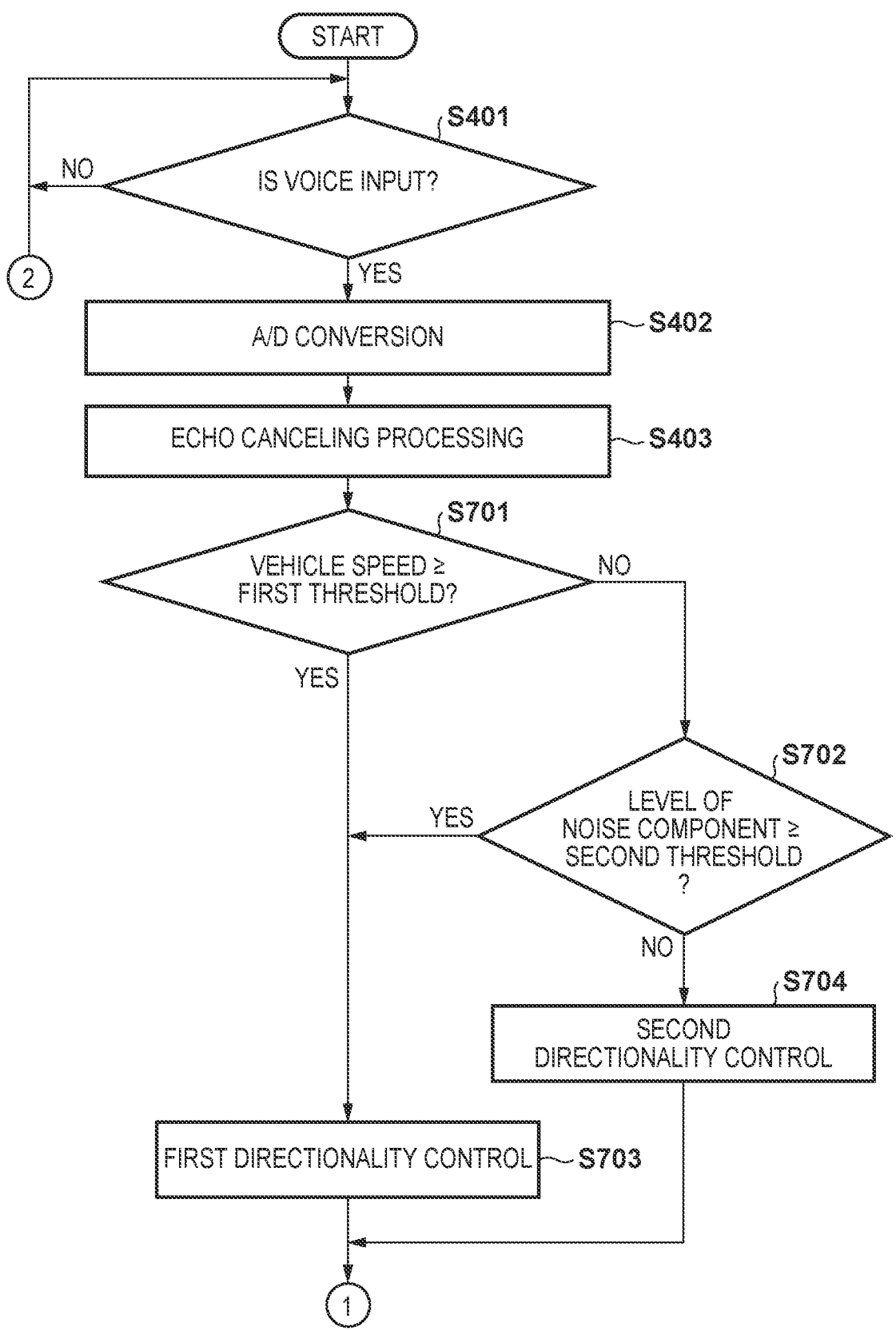
FIGS. 7A and 7B area flowchart illustrating a processing sequence performed by the vehicular apparatus according to the first variation.
Figure 7B:
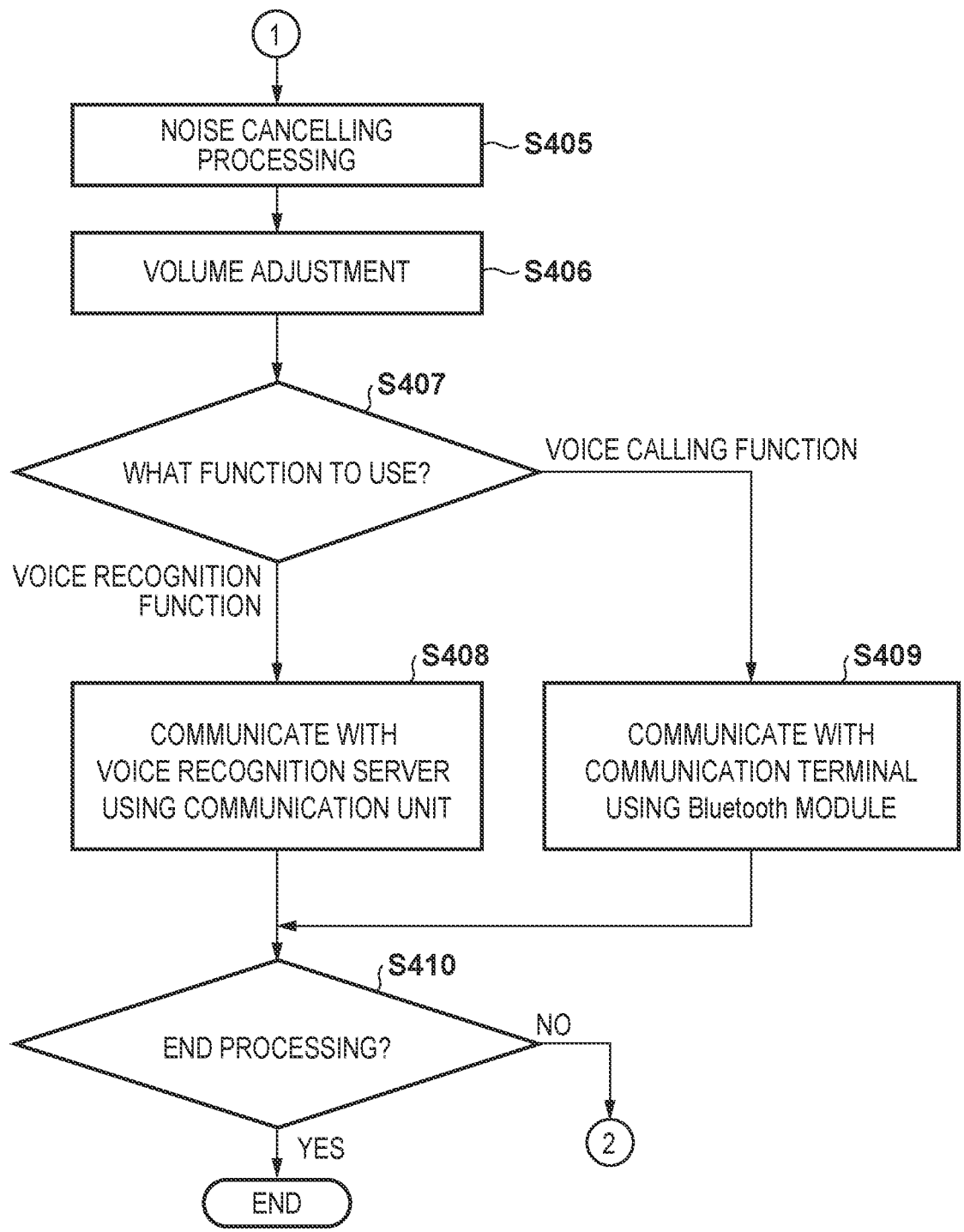

The processes of steps S401 to S403 and S405 to S410 in FIGS. 7A and 7B are the same as the corresponding processes described with reference to FIG. 4, and will therefore not be described here. In FIGS. 7A and 7B, the processes of steps S701 to S704 are performed instead of step S404 in FIG. 4.

In step S701, the directionality control unit 102 determines whether or not the vehicle speed is greater than or equal to a first threshold. This threshold is, for example, 30 km/h, but may be made to be freely configurable by the user. The sequence moves to step S703 if the vehicle speed is greater than or equal to the first threshold. However, the sequence moves to step S702 if the vehicle speed is less than the first threshold.

In step S702, the directionality control unit 102 determines whether or not the level of the noise component is greater than or equal to a second threshold. This threshold is, for example, 10 dB, but may be made to be freely configurable by the user. The sequence moves to step S703 if the level of the noise component is greater than or equal to the second threshold. However, the sequence moves to step S704 if the level of the noise component is less than the second threshold.

In step S703, the directionality control unit 102 controls the directionality directions of the plurality of microphones 20a and 20b in two directions, to the driver's seat side and the passenger seat side, and furthermore controls the gain level on the passenger seat side to be lower than the gain level on the driver's seat side. For example, the directionality is controlled as illustrated in FIG. 3 described earlier.

In step S704, the directionality control unit 102 performs second directionality control, in which the directionality directions of the plurality of microphones 20a and 20b are controlled to be substantially equal, and the gain level on the passenger seat side and the gain level on the driver's seat side are controlled to be substantially equal. For example, the directionality is controlled as illustrated in FIG. 5 or FIG. 6 described earlier.

As described thus far, different directionality control may be performed in accordance with the vehicle speed, the level of the noise component, and so on. Accordingly, when the vehicle is stopped or traveling at a low speed, or in other situations where the level of the noise component is low, the gain level on the passenger seat side is set to be substantially equal to the gain level on the driver's seat side, which makes it possible to improve the call quality on the passenger seat side. On the other hand, when the vehicle is traveling at a high speed, or in other situations where the level of the noise component is high, the gain level on the passenger seat side is set to be lower than the gain level on the driver's seat side, which makes it possible to reduce the influence of noise input from the passenger seat side.

Additionally, the directionality control unit 102 may vary the gain level dynamically between when executing the voice recognition function and when executing the voice calling function. For example, the gain level on the passenger seat side may be controlled to a higher value when executing the voice recognition function than when executing the voice calling function. Because the voice recognition function is used more frequently than the voice calling function (e.g., the hands-free calling function) on the passenger seat side, setting the gain level on the passenger seat side to be higher when using the voice recognition function than when using the hands-free calling function makes it possible to improve the voice recognition performance.

Second Variation

Instead of the directionality control described in the first variation, a plurality of vehicle speed thresholds and a plurality of noise thresholds may be set, and more detailed directionality control may be executed in accordance with the vehicle speed and noise level, as will be described in a second variation.

In the present variation, the directionality control unit 102 controls the directionality directions of the plurality of microphones 20a and 20b in two directions, to the driver's seat side and the passenger seat side, or in one direction, to the driver's seat side, and furthermore controls the gain level on the passenger seat side to be less than or equal to the gain level on the driver's seat side.

Figure 8:
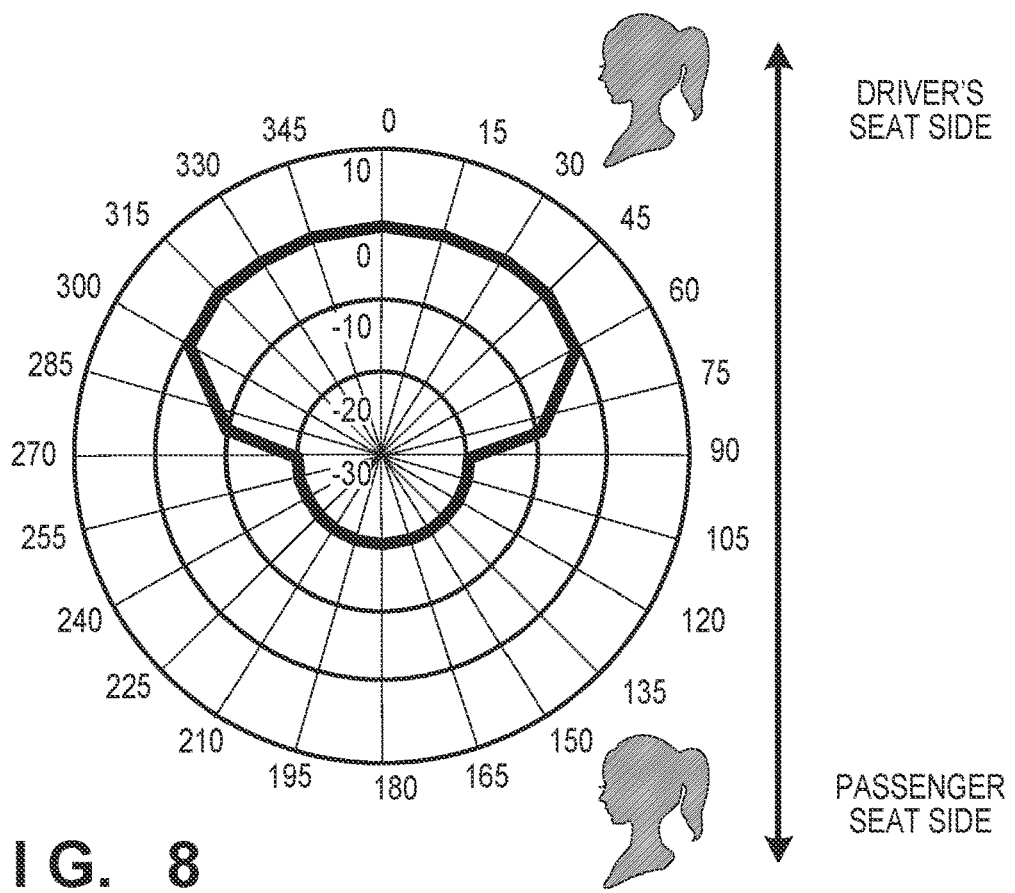
FIG. 8 is a diagram illustrating directionality control according to a second variation.
Figure 9:
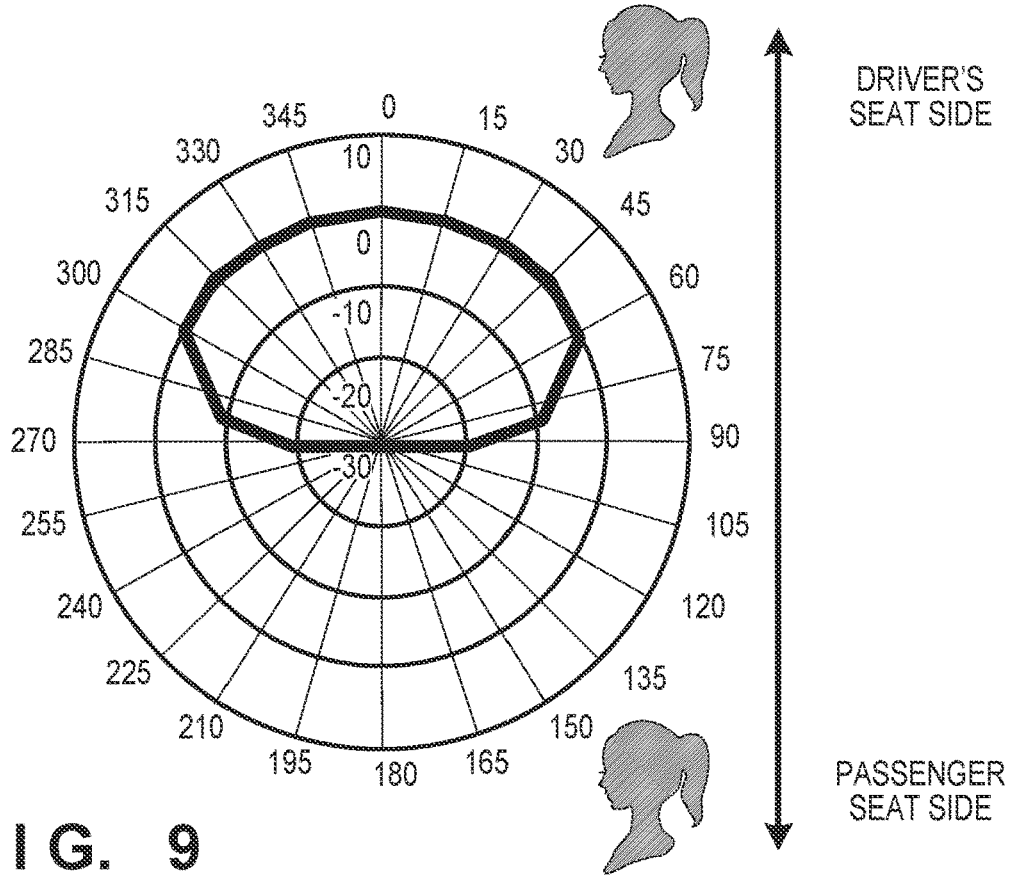
FIG. 9 is a diagram illustrating directionality control according to the second variation.

FIGS. 8 and 9 are diagrams illustrating an example of the directionality control according to the present variation. FIG. 8 illustrates an example in which the directionality directions of the plurality of microphones 20a and 20b are controlled to two directions, on the driver's seat side and the passenger seat side, and the gain level on the passenger seat side is controlled to an even lower gain level than that illustrated in FIG. 3. FIG. 9 illustrates an example in which the directionality directions of the plurality of microphones 20a and 20b are controlled to one direction, on the driver's seat side, and the gain level on the passenger seat side is set to zero.

In the present variation, a first vehicle speed threshold is set to a value in a range of, for example, 0 km/h to 3 km/h, a second vehicle speed threshold is set to, for example, 30 km/h, and a third vehicle speed threshold is set to, for example, 100 km/h. Additionally, a first noise threshold is set to a value in a range of, for example, 0 dB to 2 dB, a second noise threshold is set to, for example, 10 dB, and a third noise threshold is set to, for example, 25 dB. The directionality control illustrated in FIG. 3, 5, 6, 8, or 9 is then executed in accordance with the vehicle speed and the noise level. Note that the thresholds described here are merely examples, and it may be possible for the user to set any desired values.

Processing by Vehicular Apparatus

A processing sequence performed by the vehicular apparatus 1 according to the second variation will be described next with reference to the flowchart in FIGS. 10A and 10B.

Figure 10A:
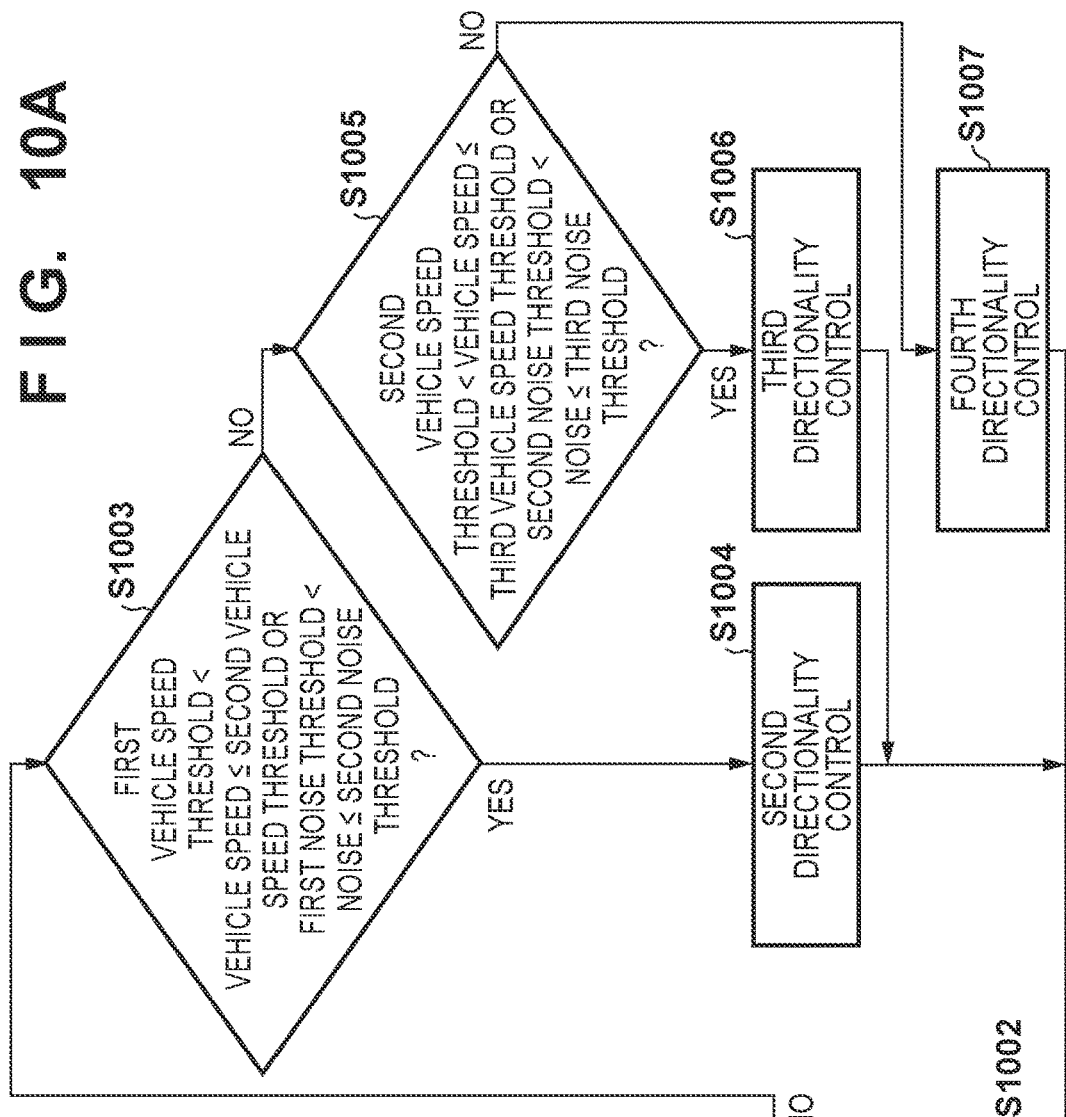
FIGS. 10A and 10B are a flowchart illustrating a processing sequence performed by the vehicular apparatus according to the second variation.
Figure 10B:
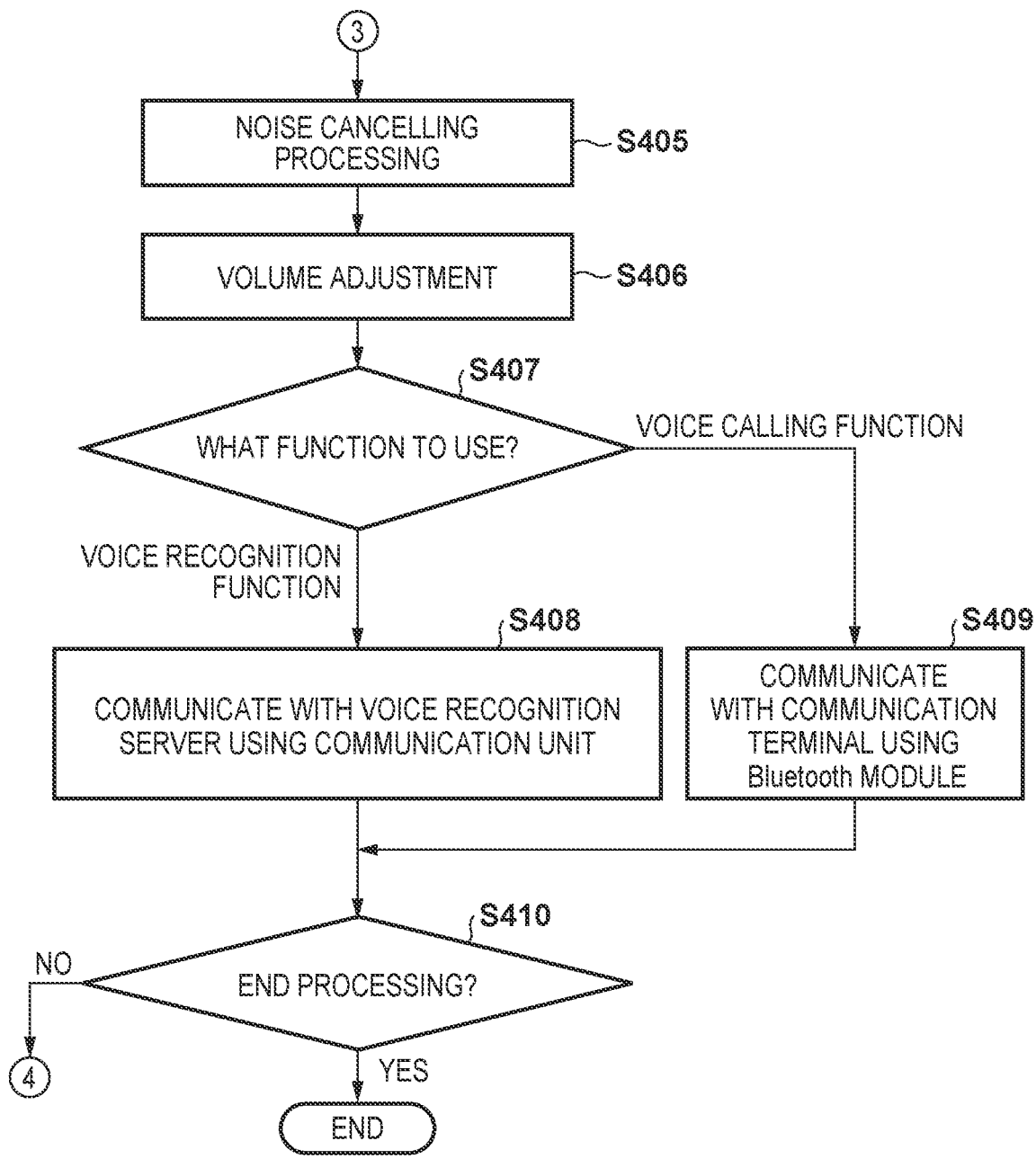

The processes of steps S401 to S403 and S405 to S410 in FIGS. 10A and 10B are the same as the corresponding processes described with reference to FIG. 4, and will therefore not be described here. In FIGS. 10A and 10B, the processes of steps S1001 to S1007 are performed instead of step S404 in FIG. 4.

In step S1001, the directionality control unit 102 determines whether the vehicle speed is less than or equal to the first vehicle speed threshold, or whether the level of the noise component is less than or equal to the first noise threshold. The sequence moves to step S1002 when a determination of "yes" is made in this step. However, the sequence moves to step S1003 when a determination of "no" is made in this step. For example, if the vehicle speed is 20 km/h and the level of the noise component is 0 dB, the sequence moves to step S1002, whereas if the vehicle speed is 20 km/h and the level of the noise component is 5 dB, the sequence moves to step S1003.

In step S1002, the directionality control unit 102 performs first directionality control, in which the directionality directions of the plurality of microphones 20a and 20b are controlled to two directions, on the driver's seat side and the passenger seat side, and the gain level on the passenger seat side is controlled to be substantially equal to the gain level on the driver's seat side. For example, the directionality is controlled as illustrated in FIG. 5 or FIG. 6 described earlier.

In step S1003, the directionality control unit 102 determines whether the vehicle speed is greater than the first vehicle speed threshold and less than or equal to the second vehicle speed threshold, or whether the level of the noise component is greater than the first noise threshold and less than or equal to the second noise threshold. The sequence moves to step S1004 when a determination of "yes" is made in this step. However, the sequence moves to step S1005 when a determination of "no" is made in this step.

In step S1004, the directionality control unit 102 controls the directionality directions of the plurality of microphones 20a and 20b in two directions, to the driver's seat side and the passenger seat side, and furthermore controls the gain level on the passenger seat side to be lower than the gain level on the driver's seat side. For example, the directionality is controlled as illustrated in FIG. 3 described earlier.

In step S1005, the directionality control unit 102 determines whether the vehicle speed is greater than the second vehicle speed threshold and less than or equal to the third vehicle speed threshold, or whether the level of the noise component is greater than the second noise threshold and less than or equal to the third noise threshold. The sequence moves to step S1006 when a determination of "yes" is made in this step. However, the sequence moves to step S1007 when a determination of "no" is made in this step.

In step S1006, the directionality control unit 102 performs third directionality control. Specifically, in the third directionality control, the directionality directions of the plurality of microphones 20a and 20b are controlled in two directions, to the driver's seat side and the passenger seat side, and the gain level on the passenger seat side is furthermore controlled to be lower than the gain level on the driver's seat side. For example, the directionality is controlled as illustrated in FIG. 8 described earlier. In FIG. 8, the gain level on the passenger seat side is controlled to be even lower than the gain level on the passenger seat side illustrated in FIG. 3.

In step S1007, the directionality control unit 102 performs fourth directionality control. Specifically, the directionality directions of the plurality of microphones 20a and 20b are controlled to the driver's seat side only. In other words, the gain level on the passenger seat side is controlled to zero. For example, the directionality is controlled as illustrated in FIG. 9.

As described thus far, according to the present variation, a plurality of threshold ranges are set for the vehicle speed and the level of the noise component, and the gain level on the passenger seat side is controlled to decrease in a plurality of steps as the vehicle speed and the level of the noise component increase. In this manner, when the vehicle speed or noise is high, the gain level on the passenger seat side is set to be lower than the gain level on the driver's seat side, which makes it possible to reduce the influence of noise input from the passenger seat side.

Although the present variation describes changing the content of the directionality control in accordance with the ranges the vehicle speed and noise are in with respect to a plurality of thresholds, control may be performed so that the gain level on the passenger seat is continuously reduced as the vehicle speed and noise increases, rather than performing directionality control which corresponds to individual threshold ranges. For example, the gain level on the passenger seat side may be controlled to decrease as the vehicle speed increases, and the gain level on the passenger seat side may be controlled to decrease as the level of the noise component increases.

Additionally, in the above-described embodiment, the directionality control may be performed on the basis only of a result of comparing the vehicle speed with a threshold, or the directionality control may be performed on the basis only of a result of comparing the level of the noise component with a threshold. For example, in FIGS. 7A and 7B, the processing may skip step S702 and branch to step S703 or step S704 depending on whether a determination of "yes" or "no" is made in step S701, or may skip step S701 and branch to step S703 or step S704 depending on whether a determination of "yes" or "no" is made in step S702. Likewise, in the determination steps of S1001, S1003, and S1005 in FIGS. 10A and 10B, the vehicle speed may be compared to each of a plurality of vehicle speed thresholds, and the processing may branch to step S1002, step S1004, step S1006, or step S1007 depending on a result of the comparison. Additionally, the level of the noise component may be compared to a plurality of noise thresholds, and the processing may branch to step S1002, step S1004, step S1006, or step S1007 depending on a result of the comparison.

According to the present invention, a favorable acoustic environment can be provided on both a driver's seat side and a passenger seat side at low cost.

Other Embodiments

A program realizing one or more of the functions described in the embodiments can be supplied to a system or apparatus over a network or through a storage medium, and one or more processors in a computer of the system or apparatus can read out and execute the program. The present invention can be carried out in such a form as well.

Summary of Embodiments

1. A vehicular apparatus according to the foregoing embodiments is a vehicular apparatus (e.g., 1) having at least one of a voice calling function and a voice recognition function, and includes: a voice input unit including a plurality of microphones (e.g., 20a and 20b), the voice input unit being disposed between a driver's seat and a passenger seat with respect to a vehicle width direction; a control unit (e.g., 102) configured to control a directionality direction and again level of each of the plurality of microphones; a noise cancelling unit (e.g., 103) configured to calculate a noise component of voice input by the voice input unit and reduce the noise component; and an execution unit (e.g., 500 and 400) configured to execute the voice calling function or the voice recognition function on the basis of voice in which the noise component has been reduced by the noise cancelling unit. The control unit controls the directionality directions of the plurality of microphones in two directions, the two directions being a driver's seat side and a passenger seat side, and controls a gain level on the passenger seat side to be lower than a gain level on the driver's seat side.

According to this embodiment, a certain S/N ratio can be ensured on the driver's seat side, where the calling frequency is relatively high; this makes it possible to provide an acoustic environment in which calls can also be made on the passenger seat side, where the calling frequency is relatively low, while at the same time improving the call quality on the driver's seat side. Additionally, the voice input module including the plurality of microphones is disposed between the driver's seat and the passenger seat with respect to the vehicle width direction, and thus manufacturing costs can be kept lower than when voice input modules are disposed in a plurality of locations. A favorable acoustic environment on both a driver's seat side and a passenger seat side can therefore be provided at low cost.

2. The vehicular apparatus according to the foregoing embodiments further includes: a communication unit (e.g., 400) configured to communicate with a communication terminal; a conversion unit (e.g., 200a and 200b) configured to convert the voice input by the voice input unit from an analog signal into a digital signal; and an echo cancelling unit (e.g., 101) configured to, on the basis of an incoming call signal received by the communication unit, reduce an echo component in the digital signal resulting from the conversion performed by the conversion unit. The noise cancelling unit calculates the noise component of the voice and reduces the noise component on the basis of the digital signal in which the echo component has been reduced by the echo cancelling unit.

According to this embodiment, because both the driver's seat side and the passenger seat side are taken as directionality directions, the performance of estimating echo is higher than when only a single specific directionality direction is used. Accordingly, the performance of the echo cancelling processing can be improved when executing the voice calling function, and particularly when executing the hands-free calling function.

3. In the vehicular apparatus according to the foregoing embodiments, the control unit changes the gain level on the passenger seat side on the basis of a vehicle speed of a vehicle in which the vehicular apparatus is disposed or a level of the noise component calculated by the noise cancelling unit.

According to this embodiment, the gain level on the passenger seat side can be dynamically controlled in accordance with the level of the noise, which makes it possible to provide an appropriate audio environment based on the circumstances.

4. In the vehicular apparatus according to the foregoing embodiments, the control unit: brings the gain level on the passenger seat side closer to the gain level on the driver's seat side the lower the vehicle speed is or the lower the level of the noise component is; and moves the gain level on the passenger seat side away from the gain level on the driver's seat side the higher the vehicle speed is or the higher the level of the noise component is.

According to this embodiment, when the vehicle speed is low (i.e., when there is a low level of noise), or in other situations where the level of the noise component is low, the gain level on the passenger seat side is set to be substantially equal to the gain level on the driver's seat side, which makes it possible to improve the call quality on the passenger seat side. Conversely, when the vehicle speed is high (i.e., when there is a high level of noise), or in other situations where the level of the noise component is high, the gain level on the passenger seat side is set to be lower than the gain level on the driver's seat side, which makes it possible to reduce the influence of noise input from the passenger seat side.

5. In the vehicular apparatus according to the foregoing embodiments, the control unit: performs first directionality control, in which the directionality directions of the plurality of microphones are controlled in two directions, the two directions being the driver's seat side and the passenger seat side, and the gain level on the passenger seat side is controlled to be lower than the gain level on the driver's seat side, when the vehicle speed is greater than or equal to a first threshold or the level of the noise component is greater than or equal to a second threshold (e.g., step S703); and performs second directionality control, in which the directionality directions of the plurality of microphones are controlled in two directions, the two directions being the driver's seat side and the passenger seat side, and the gain level on the passenger seat side is controlled to be substantially equal to the gain level on the driver's seat side, when the vehicle speed is less than the first threshold and the level of the noise component is less than the second threshold (e.g., step S704).

According to this embodiment, when the vehicle is stopped or traveling at a low speed, or in other situations where the level of the noise component is low, the gain level on the passenger seat side is set to be substantially equal to the gain level on the driver's seat side, which makes it possible to improve the call quality on the passenger seat side. On the other hand, when the vehicle is traveling at a high speed, or in other situations where the level of the noise component is high, the gain level on the passenger seat side is set to be lower than the gain level on the driver's seat side, which makes it possible to reduce the influence of noise input from the passenger seat side.

6. In the vehicular apparatus according to the foregoing embodiments, the control unit: performs first directionality control, in which the directionality directions of the plurality of microphones are controlled in two directions, the two directions being the driver's seat side and the passenger seat side, and the gain level on the passenger seat side is controlled to a first gain level, when the vehicle speed is less than or equal to a first vehicle speed threshold or the level of the noise component is less than or equal to a first noise threshold (e.g., step S1002); and performs second directionality control, in which the directionality directions of the plurality of microphones are controlled in two directions, the two directions being the driver's seat side and the passenger seat side, and the gain level on the passenger seat side is controlled to a second gain level that is lower than the first gain level, when the vehicle speed is greater than the first vehicle speed threshold and less than or equal to a second vehicle speed threshold that is greater than the first vehicle speed threshold, or when the level of the noise component is greater than the first noise threshold and less than a second noise threshold that is greater than the first noise threshold (e.g., step S1004).

According to this embodiment, when the vehicle speed or noise is high, the gain level on the passenger seat side is set to be lower than the gain level on the driver's seat side, which makes it possible to reduce the influence of noise input from the passenger seat side.

7. In the vehicular apparatus according to the foregoing embodiments, the control unit controls the directionality directions and the gain levels on the basis of the digital signal in which the echo component has been reduced by the echo cancelling unit.

According to this embodiment, the directionality control is performed after reducing the echo, and thus the performance of estimating echo can be further improved. This makes it possible to improve the performance of the echo cancelling processing.

8. In the vehicular apparatus according to the foregoing embodiments, the voice input unit is installed in a roof console (e.g., 252) of a vehicle, and functions of the echo cancelling unit, the control unit, and the noise cancelling unit are implemented by a digital signal processor in a head unit (e.g., 10) of the vehicle.

According to this embodiment, a voice input module disposed in the roof console does not include a CPU, and voice processing is instead executed by a CPU provided in the head unit of the vehicle. This makes it possible to reduce the space taken up by the voice input module and reduce costs.

9. In the vehicular apparatus according to the foregoing embodiments, the vehicular apparatus has both the voice calling function and the voice recognition function, and the control unit controls the gain level on the passenger seat side to a higher value when executing the voice recognition function than when executing the voice calling function.

The voice recognition function tends to be used more frequently than the voice calling function on the passenger seat side, and thus according to this embodiment, setting the gain level on the passenger seat to be higher when using the voice recognition function than when using the voice calling function makes it possible to improve the voice recognition performance.

10. In the vehicular apparatus according to the foregoing embodiments, the voice calling function is a hands-free calling function.

According to this embodiment, a favorable acoustic environment can be provided on both the driver's seat side and the passenger seat side when using the hands-free calling function.

11. A vehicle according to the foregoing embodiments is a vehicle including the vehicular apparatus (e.g., 1) according to the foregoing embodiments.

According to this embodiment, the processing performed by the vehicular apparatus can be implemented in a vehicle.

12. An operation method of a vehicular apparatus according to the foregoing embodiments is an operation method of a vehicular apparatus (e.g., 1) having at least one of a voice calling function and a voice recognition function, the method including: inputting voice through a plurality of microphones (e.g., 20a and 20b) disposed between a driver's seat and a passenger seat with respect to a vehicle width direction; controlling a directionality direction and a gain level of each of the plurality of microphones (e.g., step S404); calculating a noise component of voice input in the inputting of voice and reducing the noise component (e.g., step S405); and executing the voice calling function or the voice recognition function on the basis of voice in which the noise component has been reduced in the reducing of the noise component (e.g., steps S408 and S409). In the controlling, the directionality directions of the plurality of microphones are controlled in two directions, the two directions being a driver's seat side and a passenger seat side, and a gain level on the passenger seat side is controlled to be lower than a gain level on the driver's seat side.

According to this embodiment, a certain S/N ratio can be ensured on the driver's seat side, where the calling frequency is relatively high; this makes it possible to provide an acoustic environment in which calls can also be made on the passenger seat side, where the calling frequency is relatively low, while at the same time improving the call quality on the driver's seat side. Additionally, the voice input module including the plurality of microphones is disposed between the driver's seat and the passenger seat with respect to the vehicle width direction, and thus manufacturing costs can be kept lower than when voice input modules are disposed in a plurality of locations. A favorable acoustic environment on both a driver's seat side and a passenger seat side can therefore be provided at low cost.

13. A storage medium according to the foregoing embodiments is a non-transitory computer-readable storage medium storing a program for causing a computer to function as the vehicular apparatus (e.g., 1) according to the foregoing embodiments.

According to this embodiment, the present invention can be implemented by a computer.

The invention is not limited to the foregoing embodiments, and various variations/changes are possible within the spirit of the invention.

What is claimed is:

1. A vehicular apparatus having at least one of a voice calling function and a voice recognition function, the apparatus comprising a voice input unit including a plurality of microphones, the voice input unit being disposed between a driver's seat and a passenger seat with respect to a vehicle width direction, the apparatus further comprising:
   a memory storing a program; and
   one or more processors which, by executing the program, function as:
      a control unit configured to control a directionality direction and a gain level of each of the plurality of microphones;

a noise cancelling unit configured to calculate a noise component of voice input by the voice input unit and reduce the noise component; and an execution unit configured to execute the voice calling function or the voice recognition function on the basis of voice in which the noise component has been reduced by the noise cancelling unit, wherein the control unit controls the directionality directions of the plurality of microphones in two directions, the two directions being a driver's seat side and a passenger seat side, and controls a gain level on the passenger seat side to be lower than a gain level on the driver's seat side, wherein the control unit changes the gain level on the passenger seat side on the basis of a vehicle speed of a vehicle in which the vehicular apparatus is disposed or a level of the noise component calculated by the noise cancelling unit, wherein the control unit:

brings the gain level on the passenger seat side closer to the gain level on the driver's seat side the lower the vehicle speed is or the lower the level of the noise component is; and moves the gain level on the passenger seat side away from the gain level on the driver's seat side the higher the vehicle speed is or the higher the level of the noise component is.

2. The vehicular apparatus according to claim 1, wherein the one or more processors further function as:

a communication unit configured to communicate with a communication terminal;

a conversion unit configured to convert the voice input by the voice input unit from an analog signal into a digital signal; and an echo cancelling unit configured to, on the basis of an incoming call signal received by the communication unit, reduce an echo component in the digital signal resulting from the conversion performed by the conversion unit, wherein the noise cancelling unit calculates the noise component of the voice and reduces the noise component on the basis of the digital signal in which the echo component has been reduced by the echo cancelling unit.

3. A vehicular apparatus having at least one of a voice calling function and a voice recognition function, the apparatus comprising a voice input unit including a plurality of microphones, the voice input unit being disposed between a driver's seat and a passenger seat with respect to a vehicle width direction, the apparatus further comprising:

a memory storing a program; and one or more processors which, by executing the program, function as:

a control unit configured to control a directionality direction and a gain level of each of the plurality of microphones;

a noise cancelling unit configured to calculate a noise component of voice input by the voice input unit and reduce the noise component; and an execution unit configured to execute the voice calling function or the voice recognition function on the basis of voice in which the noise component has been reduced by the noise cancelling unit, wherein the control unit controls the directionality directions of the plurality of microphones in two directions, the two directions being a driver's seat side and a passenger seat side, and controls a gain level on the passenger seat side to be lower than a gain level on the driver's seat side, wherein the control unit changes the pain level on the passenger seat side on the basis of a vehicle speed of a vehicle in which the vehicular apparatus is disposed or a level of the noise component calculated b the noise cancelling unit, wherein the control unit:

performs first directionality control, in which the directionality directions of the plurality of microphones are controlled in two directions, the two directions being the driver's seat side and the passenger seat side, and the gain level on the passenger seat side is controlled to be lower than the gain level on the driver's seat side, when the vehicle speed is greater than or equal to a first threshold or the level of the noise component is greater than or equal to a second threshold; and performs second directionality control, in which the directionality directions of the plurality of microphones are controlled in two directions, the two directions being the driver's seat side and the passenger seat side, and the gain level on the passenger seat side is controlled to be substantially equal to the gain level on the driver's seat side, when the vehicle speed is less than the first threshold and the level of the noise component is less than the second threshold.

4. A vehicular apparatus having at least one of a voice calling function and a voice recognition function, the apparatus comprising a voice input unit including a plurality of microphones, the voice input unit being disposed between a driver's seat and a passenger seat with respect to a vehicle width direction, the apparatus further comprising:

a memory storing a program; and one or more processors which, by executing the program, function as:

a control unit configured to control a directionality direction and a gain level of each of the plurality of microphones;

a noise cancelling unit configured to calculate a noise component of voice input by the voice input unit and reduce the noise component; and an execution unit configured to execute the voice calling function or the voice recognition function on the basis of voice in which the noise component has been reduced by the noise cancelling unit, wherein the control unit controls the directionality directions of the plurality of microphones in two directions, the two directions being a driver's seat side and a passenger seat side, and controls a pain level on the passenger seat side to be lower than a pain level on the driver's seat side, wherein the control unit changes the pain level on the passenger seat side on the basis of a vehicle speed of a vehicle in which the vehicular apparatus is disposed or a level of the noise component calculated by the noise cancelling unit, wherein the control unit:

performs first directionality control, in which the directionality directions of the plurality of microphones are controlled in two directions, the two directions being the driver's seat side and the passenger seat side, and the gain level on the passenger seat side is controlled to a first gain level, when the vehicle speed is less than or equal to a first vehicle speed threshold or the level of the noise component is less than or equal to a first noise threshold; and performs second directionality control, in which the directionality directions of the plurality of microphones are controlled in two directions, the two directions being the driver's seat side and the passenger seat side, and the gain level on the passenger seat side is controlled to a second gain level that is lower than the first gain level, when the vehicle speed is greater than the first vehicle speed threshold and less than or equal to a second vehicle speed threshold that is greater than the first vehicle speed threshold, or when the level of the noise component is greater than the first noise threshold and less than a second noise threshold that is greater than the first noise threshold.

5. The vehicular apparatus according to claim 2, wherein the control unit controls the directionality directions and the gain levels on the basis of the digital signal in which the echo component has been reduced by the echo cancelling unit.

6. The vehicular apparatus according to claim 2, wherein the voice input unit is installed in a roof console of a vehicle, and functions of the echo cancelling unit, the control unit, and the noise cancelling unit are implemented by a digital signal processor in a head unit of the vehicle.

7. The vehicular apparatus according to claim 1, wherein the vehicular apparatus has both the voice calling function and the voice recognition function, and the control unit controls the gain level on the passenger seat side to a higher value when executing the voice recognition function than when executing the voice calling function.

8. The vehicular apparatus according to claim 1, wherein the voice calling function is a hands-free calling function.

9. A vehicle comprising the vehicular apparatus according to claim 1.

10. An operation method of a vehicular apparatus having at least one of a voice calling function and a voice recognition function, the method comprising:

inputting voice through a plurality of microphones disposed between a driver's seat and a passenger seat with respect to a vehicle width direction;

controlling a directionality direction and a gain level of each of the plurality of microphones;

calculating a noise component of voice input in the inputting of voice and reducing the noise component; and executing the voice calling function or the voice recognition function on the basis of voice in which the noise component has been reduced in the reducing of the noise component, wherein in the controlling, the directionality directions of the plurality of microphones are controlled in two directions, the two directions being a driver's seat side and a passenger seat side, and a gain level on the passenger seat side is controlled to be lower than a gain level on the driver's seat side, wherein the gain level on the passenger seat side is changed on the basis of a vehicle speed of a vehicle in which the vehicular apparatus is disposed or a level of the noise component calculated, and wherein:

the gain level on the passenger seat side is brought closer to the gain level on the driver's seat side the lower the vehicle speed is or the lower the level of the noise component is; and the gain level on the passenger seat side is moved away from the gain level on the driver's seat side the higher the vehicle speed is or the higher the level of the noise component is.

11. A non-transitory computer-readable storage medium in which is stored a program for causing a computer to execute each step of an operation method of a vehicular apparatus, the vehicular apparatus having at least one of a voice calling function and a voice recognition function, and the method comprising:

inputting voice through a plurality of microphones disposed between a driver's seat and a passenger seat with respect to a vehicle width direction;

controlling a directionality direction and a gain level of each of the plurality of microphones;

calculating a noise component of voice input the inputting of voice and reducing the noise component; and executing the voice calling function or the voice recognition function on the basis of voice in which the noise component has been reduced in the reducing of the noise component, wherein in the controlling, the directionality directions of the plurality of microphones are controlled in two directions, the two directions being a driver's seat side and a passenger seat side, and a gain level on the passenger seat side is controlled to be lower than a gain level on the driver's seat side, wherein the gain level on the passenger seat side is changed on the basis of a vehicle speed of a vehicle in which the vehicular apparatus is disposed or a level of the noise component calculated, and wherein:

the gain level on the passenger seat side is brought closer to the gain level on the driver's seat side the lower the vehicle speed is or the lower the level of the noise component is; and the gain level on the passenger seat side is moved away from the gain level on the driver's seat side the higher the vehicle speed is or the higher the level of the noise component is.

12. An operation method of a vehicular apparatus having at least one of a voice calling function and a voice recognition function, the vehicular apparatus comprising a voice input unit including a plurality of microphones, the voice input unit being disposed between a driver's seat and a passenger seat with respect to a vehicle width direction, the operation method comprising:

controlling a directionality direction and a gain level of each of the plurality of microphones;

calculating a noise component of voice input by the voice input unit and reducing the noise component; and executing the voice calling function or the voice recognition function on the basis of voice in which the noise component has been reduced, wherein the directionality directions of the plurality of microphones are controlled in two directions, the two directions being a driver's seat side and a passenger seat side, and a gain level on the passenger seat side is controlled to be lower than a gain level on the driver's seat side, wherein the gain level on the passenger seat side is changed on the basis of a vehicle speed of a vehicle in which the vehicular apparatus is disposed or a level of the noise component calculated, wherein the controlling of the directionality direction and the gain level of each of the plurality of microphones further comprises:
performing a first directionality control, in which the directionality directions of the plurality of microphones are controlled in two directions, the two directions being the driver's seat side and the passenger seat side, and the gain level on the passenger seat side is controlled to be lower than the gain level on the driver's seat side, when the vehicle speed is greater than or equal to a first threshold or the level of the noise component is greater than or equal to a second threshold; and
performing a second directionality control, in which the directionality directions of the plurality of microphones are controlled in two directions, the two directions being the driver's seat side and the passenger seat side, and the gain level on the passenger seat side is controlled to be substantially equal to the gain level on the driver's seat side, when the vehicle speed is less than the first threshold and the level of the noise component is less than the second threshold.

13. A non-transitory computer-readable storage medium in which is stored a program for causing a computer to execute each step of an operation method of a vehicular apparatus having at least one of a voice calling function and a voice recognition function, the vehicular apparatus comprising a voice input unit including a plurality of microphones, the voice input unit being disposed between a driver's seat and a passenger seat with respect to a vehicle width direction, the operation method comprising:
controlling a directionality direction and a gain level of each of the plurality of microphones;
calculating a noise component of voice input by the voice input unit and reducing the noise component; and
executing the voice calling function or the voice recognition function on the basis of voice in which the noise component has been reduced,
wherein the directionality directions of the plurality of microphones are controlled in two directions, the two directions being a driver's seat side and a passenger seat side, and a gain level on the passenger seat side is controlled to be lower than a gain level on the driver's seat side,
wherein the gain level on the passenger seat side is changed on the basis of a vehicle speed of a vehicle in which the vehicular apparatus is disposed or a level of the noise component calculated,
wherein the controlling of the directionality direction and the gain level of each of the plurality of microphones further comprises:
performing a first directionality control, in which the directionality directions of the plurality of microphones are controlled in two directions, the two directions being the driver's seat side and the passenger seat side, and the gain level on the passenger seat side is controlled to be lower than the gain level on the driver's seat side, when the vehicle speed is greater than or equal to a first threshold or the level of the noise component is greater than or equal to a second threshold; and
performing a second directionality control, in which the directionality directions of the plurality of microphones are controlled in two directions, the two directions being the driver's seat side and the passenger seat side, and the gain level on the passenger seat side is controlled to be substantially equal to the gain level on the driver's seat side, when the vehicle speed is less than the first threshold and the level of the noise component is less than the second threshold.

14. An operation method of a vehicular apparatus having at least one of a voice calling function and a voice recognition function, the vehicular apparatus comprising a voice input unit including a plurality of microphones, the voice input unit being disposed between a driver's seat and a passenger seat with respect to a vehicle width direction, the operation method comprising:
controlling a directionality direction and a gain level of each of the plurality of microphones;
calculating a noise component of voice input by the voice input unit and reducing the noise component; and
executing the voice calling function or the voice recognition function on the basis of voice in which the noise component has been reduced,
wherein the directionality directions of the plurality of microphones is controlled in two directions, the two directions being a driver's seat side and a passenger seat side, and a gain level on the passenger seat side is controlled to be lower than a gain level on the driver's seat side,
wherein the gain level on the passenger seat side is changed on the basis of a vehicle speed of a vehicle in which the vehicular apparatus is disposed or a level of the noise component calculated,
wherein the controlling of the directionality direction and the gain level of each of the plurality of microphones further comprises:
performing a first directionality control, in which the directionality directions of the plurality of microphones are controlled in two directions, the two directions being the driver's seat side and the passenger seat side, and the gain level on the passenger seat side is controlled to a first gain level, when the vehicle speed is less than or equal to a first vehicle speed threshold or the level of the noise component is less than or equal to a first noise threshold; and
performing a second directionality control, in which the directionality directions of the plurality of microphones are controlled in two directions, the two directions being the driver's seat side and the passenger seat side, and the gain level on the passenger seat side is controlled to a second gain level that is lower than the first gain level, when the vehicle speed is greater than the first vehicle speed threshold and less than or equal to a second vehicle speed threshold that is greater than the first vehicle speed threshold, or when the level of the noise component is greater than the first noise threshold and less than a second noise threshold that is greater than the first noise threshold.

15. A non-transitory computer-readable storage medium in which is stored a program for causing a computer to execute each step of an operation method of a vehicular apparatus having at least one of a voice calling function and a voice recognition function, the vehicular apparatus comprising a voice input unit including a plurality of microphones, the voice input unit being disposed between a drivers seat and a passenger seat with respect to a vehicle width direction, the operation method comprising:
controlling a directionality direction and a gain level of each of the plurality of microphones;

calculating a noise component of voice input by the voice input unit and reduce the noise component; and executing the voice calling function or the voice recognition function on the basis of voice in which the noise component has been reduced, wherein the directionality directions of the plurality of microphones is controlled in two directions, the two directions being a driver's seat side and a passenger seat side, and a gain level on the passenger seat side is controlled to be lower than a gain level on the driver's seat side, wherein the gain level on the passenger seat side is changed on the basis of a vehicle speed of a vehicle in which the vehicular apparatus is disposed or a level of the noise component calculated, and wherein the controlling of the directionality direction and the gain level of each of the plurality of microphones further comprises:

performing a first directionality control, in which the directionality directions of the plurality of microphones are controlled in two directions, the two directions being the driver's seat side and the passenger seat side, and the gain level on the passenger seat side is controlled to a first gain level, when the vehicle speed is less than or equal to a first vehicle speed threshold or the level of the noise component is less than or equal to a first noise threshold; and performing a second directionality control, in which the directionality directions of the plurality of microphones are controlled in two directions, the two directions being the driver's seat side and the passenger seat side, and the gain level on the passenger seat side is controlled to a second gain level that is lower than the first gain level, when the vehicle speed is greater than the first vehicle speed threshold and less than or equal to a second vehicle speed threshold that is greater than the first vehicle speed threshold, or when the level of the noise component is greater than the first noise threshold and less than a second noise threshold that is greater than the first noise threshold.

16. A vehicular apparatus having at least one of a voice calling function and a voice recognition function; the apparatus comprising a voice input unit including a plurality of microphones, the voice input unit being disposed between a driver's seat and a passenger seat with respect to a vehicle width direction, the apparatus further comprising:

a memory storing a program; and one or more processors which, by executing the program, function as:

a control unit configured to control a directionality direction and a gain level of each of the plurality of microphones;

a noise cancelling unit configured to calculate a noise component of voice input by the voice input unit and reduce the noise component; and an execution unit configured to execute the voice calling function or the voice recognition function on the basis of voice in which the noise component has been reduced by the noise cancelling unit, wherein the control unit controls the directionality directions of the plurality of microphones in two directions, the two directions being a driver's seat side and a passenger seat side, and controls a gain level on the passenger seat side to be lower than a gain level on the driver's seat side, wherein the control unit changes the gain level on the passenger seat side on the basis of a vehicle speed of a vehicle in which the vehicular apparatus is disposed or a level of the noise component calculated by the noise cancelling unit.

17. An operation method of a vehicular apparatus having at least one of a voice calling function and a voice recognition function, the vehicular apparatus comprising a voice input unit including a plurality of microphones, the voice input unit being disposed between a driver's seat and a passenger seat with respect to a vehicle width direction, the operation method comprising:

controlling a directionality direction and a gain level of each of the plurality of microphones;

calculating a noise component of voice input by the voice input unit and reducing the noise component; and executing the voice calling function or the voice recognition function on the basis of voice in which the noise component has been reduced, wherein the directionality directions of the plurality of microphones is controlled in two directions, the two directions being a driver's seat side and a passenger seat side, and a gain level on the passenger seat side is controlled to be lower than a gain level on the driver's seat side, wherein the gain level on the passenger seat side is changed on the basis of a vehicle speed of a vehicle in which the vehicular apparatus is disposed or a level of the noise component calculated.

18. A non-transitory computer-readable storage medium in which is stored a program for causing a computer to execute each step of an operation method of a vehicular apparatus having at least one of a voice calling function and a voice recognition function, the vehicular apparatus comprising a voice input unit including a plurality of microphones, the voice input unit being disposed between a driver's seat and a passenger seat with respect to a vehicle width direction, the operation method comprising:

controlling a directionality direction and a gain level of each of the plurality of microphones;

calculating a noise component of voice input by the voice input unit and reducing the noise component; and executing the voice calling function or the voice recognition function on the basis of voice in which the noise component has been reduced, wherein the directionality directions of the plurality of microphones is controlled in two directions, the two directions being a driver's seat side and a passenger seat side, and a gain level on the passenger seat side is controlled to be lower than a gain level on the driver's seat side, wherein the gain level on the passenger seat side is changed on the basis of a vehicle speed of a vehicle in which the vehicular apparatus is disposed or a level of the noise component calculated.

\* \* \* \* \*